Aug. 21, 1945.  J. H. BOICEY ET AL  2,382,956
PROCESS OF MANUFACTURE OF SAFETY GLASS
Filed Oct. 21, 1942  2 Sheets-Sheet 1

Inventors
JAMES H. BOICEY.
IRVIN A. WILLEY.
By Frank Fraser
Attorney

Aug. 21, 1945.   J. H. BOICEY ET AL   2,382,956
PROCESS OF MANUFACTURE OF SAFETY GLASS
Filed Oct. 21, 1942    2 Sheets-Sheet 2

Inventors
JAMES H. BOICEY.
IRVIN A. WILLEY.

By Frank Grosser
Attorney

Patented Aug. 21, 1945

2,382,956

UNITED STATES PATENT OFFICE 2,382,956

PROCESS OF MANUFACTURE OF SAFETY GLASS

James H. Boicey and Irvin A. Willey, Toledo, Ohio, assignors to Libbey-Owens-Ford Glass Company, Toledo, Ohio, a corporation of Ohio Application October 21, 1942, Serial No. 462,798

4 Claims. (Cl. 154—2.71)

The present invention relates to safety glass and more particularly to laminated safety glass of the type in which the reinforcing plastic interlayer extends beyond the covering glass sheets to form a border therefor, and to the processes of manufacture of such glass.

This type of extended-plastic laminated glass is now being employed for glazing the windshield and window openings in airplanes and other aircraft. The safety glass is mounted in the opening to be glazed by clamping the plastic border portion thereof only in the supporting frame as distinguished from clamping the marginal portions of the glass sheets themselves. By clamping the plastic border only, the laminated glass has a certain flexibility or freedom of movement relative to the supporting frame permitting it to "float" therein so that torsion and shock to which the airplane may be subjected in flight will not be transmitted directly to the glass thereby materially reducing the possibility of glass breakage.

Another advantage of this type of safety glass is that it can be mounted in such a manner that the outer surface of the glass is flush with the outer wall or skin of the plane whereby to reduce air resistance and promote efficiency. The plastic border may either be of the same thickness as the plastic interlayer between the glass sheets or it can be built up to a relatively greater thickness as desired.

One process of making laminated safety glass of the above type has been to assemble the glass and plastic laminations to be joined to form a "sandwich" and then place the sandwich in a rubber bag or other flexible container from which the air is exhausted. The flexible container and its contents are then placed in an autoclave and subjected to the action of a heated fluid under pressure to effect the compositing of the glass-plastic laminations. The glass sheets are initially cut relatively smaller than the plastic interlayer so that when the laminations are properly assembled the plastic extends beyond the edges of the glass sheets to provide a border. This process has, however, not proven entirely satisfactory because of the tendency for the edges of the plastic border to be pinched between the walls of the flexible container during pressing in the autoclave, resulting in a tapering, thinning or other deformation of said edges which renders difficult the mounting of the laminated structure in the supporting frame.

An object of this invention is to provide an improved process of manufacture of laminated safety glass having a border of plastic material projecting therefrom and in the practice of which the plastic border is effectually protected against deformation during the compositing of the assembled laminations to the end that pinching of the edges of the extended plastic and consequent tapering or thinning thereof is eliminated.

Another object of the invention is to provide an improved process of building up the thickness of the plastic border when it is desired that it be of a thickness greater than that of the plastic interlayer between the covering glass sheets.

Other objects and advantages of the invention will become more apparent during the course of the following description, when taken in connection with the accompanying drawings.

In the drawings, wherein like numerals are employed to designate like parts throughout the same:

Figure 1:
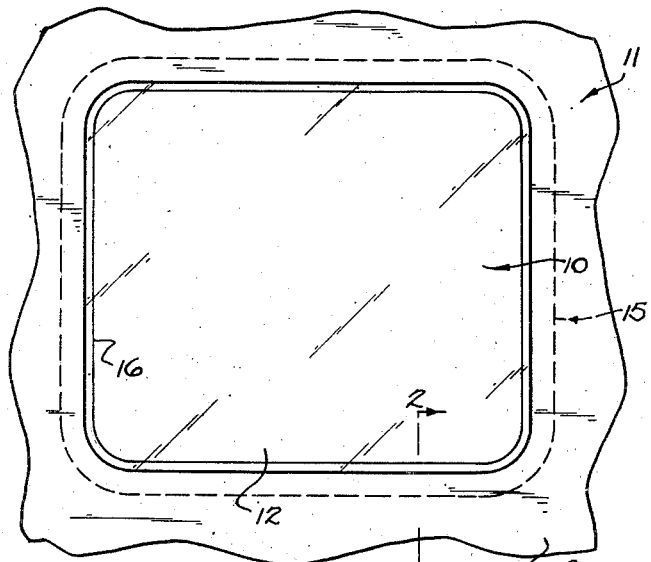
Fig. 1 is a front view of a sheet of laminated safety glass made in accordance with the invention.
Figure 2:
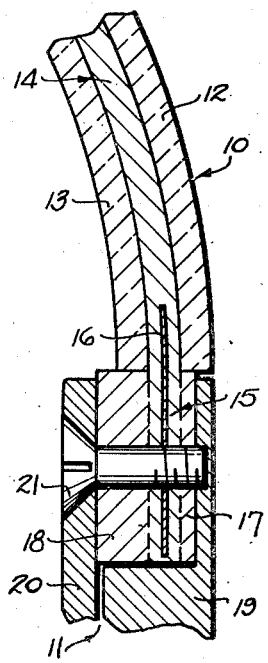
Fig. 2 is a transverse section taken on line 2—2 of Fig. 1.

With reference now to the drawings and particularly to Figs. 1 and 2, there is illustrated a sheet of laminated safety glass 10, which may be either flat or bent to any desired curvature, mounted in a frame 11. The safety glass 10 comprises two sheets of glass 12 and 13 and an interposed interlayer 14 of plastic material bonded to the glass sheets to provide a unitary structure. It will be noted that the glass sheets 12 and 13 are coextensive with one another and that the surface area thereof is relatively less than the surface area of the plastic interlayer 14 so that the interlayer extends beyond the edges of the glass sheets to provide a projecting plastic border 15.

The plastic border 15 may be reinforced, if desired, by flexible strips 16 preferably of sheet metal embedded in the extended plastic and projecting slightly inwardly of the edges of the glass sheets.

The glass sheets may consist of ordinary plate or window glass and may be either fully tempered or semi-tempered or any desired combination of glass sheets may be used. Likewise, sheets of relatively hard plastic material may be substituted for either one or both of the glass sheets. The plastic interlayer is preferably formed of a synthetic resin material such as, for example, a polyvinyl acetal resin. However, different plastics varying in thickness and physical characteristics may be employed and the invention is not limited to the use of any particular resin, class of resin, cellulosic derivatives or the like.

Safety glass of this type in which the projecting plastic border is of substantially the same thickness as the plastic interlayer between the glass sheets is now being used extensively in the glazing of airplanes and other aircraft. However, there is also an increasing demand for safety glass of this type in which the thickness of the plastic border is relatively greater than that of the plastic interlayer. The thickness of the plastic border depends largely upon the use to which the safety glass is to be put and the type of mounting in which it is to be secured. For example, as shown in Fig. 2, the plastic border 15 may be built up so that it overlaps approximately one-half of the peripheral edge of the outer glass sheet 12 and projects beyond the inner glass sheet 13. This is accomplished by bonding to the plastic border 15 additional strips of plastic 17 and 18 of the desired thickness or thicknesses. The strips 17 and 18 may be of the same kind of plastic as the interlayer 14 or a different plastic may be used.

The frame 11 in which the safety glass is mounted may be of any suitable construction and as here shown comprises a fixed section 19 and a movable section 20 between which the plastic border 15 is secured by screws or the like 21. The fixed frame section 19 may constitute a part of the outer wall or skin of the plane.

Figure 3:
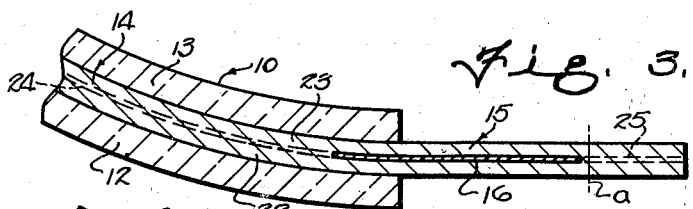
Fig. 3 is a transverse section showing the several laminations to be joined in properly assembled relation.

In fabricating the laminated safety glass 10, the glass and plastic laminations are first properly assembled with one another to form a so-called "sandwich." This is done by positioning the layer or layers of plastic forming the interlayer 14 between the glass sheets 12 and 13. As shown in Fig. 3, the plastic interlayer is made up of two outer layers of plastic 22 and 23 and an intermediate layer 24, although the number and relative thicknesses of the layers may be varied as desired. The metal reinforcing strips 16 are arranged between the outer layers of plastic 22 and 23 and the intermediate layer 24 is cut relatively smaller than said outer layers to compensate for the metal strips. Separate strips of plastic 25 are also arranged between the plastic layers 22 and 23 outwardly of metal strips 16.

Figure 5:
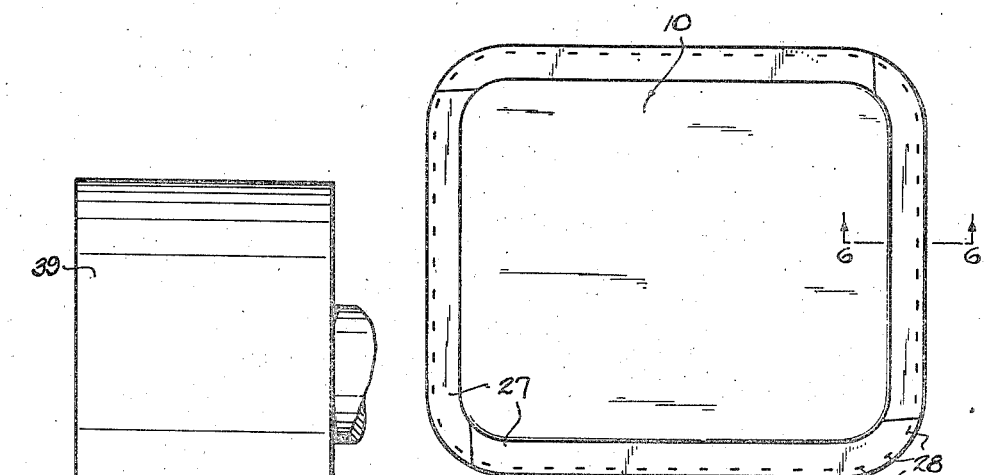
Fig. 5 is a plan view of the laminations ready for laminating.

When the several laminations have been assembled in the manner explained above they are subjected to an amount of pressure, either hand or mechanical, sufficient to cause them to adhere to one another so that they can be handled as a unit. The next step is the protecting of the plastic border 15 to avoid pinching or distortion thereof during final compositing of the laminations. For this purpose, strips 26 and 27 of a suitable type paperboard are arranged at opposite sides of the plastic border to form a continuous frame around the edges of the glass sheets as shown in Fig. 5.

Figure 4:
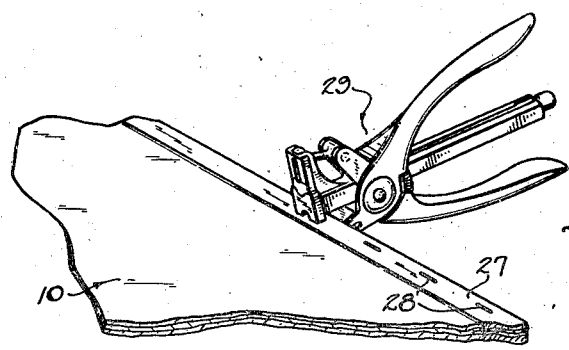
Fig. 4 is a perspective view illustrating the application of protecting strips to the plastic border prior to laminating.

The protecting strips 26 and 27 are preferably of substantially the same thickness as the glass sheets and are secured to the plastic border by metal staples or the like 28 which pass through the plastic border closely adjacent its outer edge. The staples 28 can be applied in any desired manner such as by means of a conventional stapling plier 29 illustrated in Fig. 4. The term "paperboard" is herein used in a generic sense and includes cardboard, clothboard, fiberboard, etc. When making flat sheets of safety glass the strips of paperboard need not necessarily be flexible but when used in the making of curved sheets of safety glass they must bend to conform to the curvature of the glass sheets without cracking. These strips are usually from .070 to .080 of an inch thick.

Figure 7:
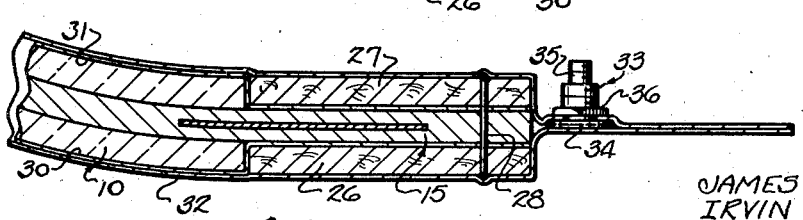
Fig. 7 is a transverse section showing the assembled laminations arranged in the flexible container in which they are pressed.

Before application of the protecting strips 26 and 27 to the plastic border 15, the outer surfaces of the glass sheets 12 and 13 are covered with sheets of cellulose acetate 30 and 31 respectively of non-adhering character such as Cellophane or "Vuepack" and this sheeting also extends over the peripheral edges of the glass sheets and the plastic border as shown at 30' and 31'. These covering sheets are provided to prevent the strips of paperboard 26 and 27 from adhering to the plastic border during the compositing operation and also to prevent the flexible container 32 (Fig. 7) in which the assembly is pressed from adhering to the glass sheets.

Figure 6:
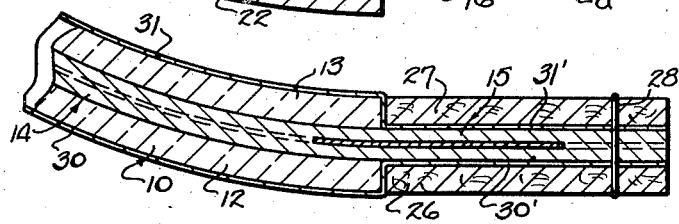
Fig. 6 is a transverse section taken on line 6—6 of Fig. 5.

After the assembly has been prepared as shown in Fig. 6, it is arranged within the flexible container 32 which may be formed of rubber, rubber composition, or from a polyvinyl alcohol material of the character disclosed and claimed in the copending application of Joseph D. Ryan, Serial No. 416,223. The polyvinyl alcohol material will adhere to itself simply by wetting with water so that in order to close the container it is simply necessary to wrap a sheet of the material around the assembly, moisten the overlapping marginal portions of the sheeting and press them tightly together.

The interior of the flexible container 32 is then evacuated and this may be accomplished by providing a suitable valve arrangement 33 so that the air may be removed by the use of an ordinary vacuum pump. The valve 33 may include a base 34 provided with a shank 35 on which is threaded a nut 36. The shank 35 can simply be inserted through an opening in one wall of the container 32 and secured thereto by the nut 36. The flexible container and its contents are then subjected to heat and pressure sufficient to bond the separate elements of the assembly into a composite sheet. This pressing operation can be carried out in an air autoclave and, by way of example only, the assembly may be subjected to approximately 40 pounds pressure per square inch at a temperature of 275° F. for about 20 minutes.

After the pressing operation, the laminated sheet is removed from the flexible container 32 and the protecting strips 26 and 27 detached from the plastic border. The marginal portion of the plastic border which has been marred by the metal staples 28 is also trimmed off as indicated at $a$ in Fig. 3. The laminated sheet is now ready for use and may be installed in any suitable type mounting. In this unit, the plastic border is of substantially the same thickness as the plastic interlayer between the glass sheets and, as pointed out above, such a unit is now being extensively used in the glazing of airplanes and other aircraft. However, there is also a considerable demand for units in which the plastic border is of relatively greater thickness than the plastic interlayer and this invention contemplates an improved process of building up the plastic border to the desired thickness.

Figure 9:
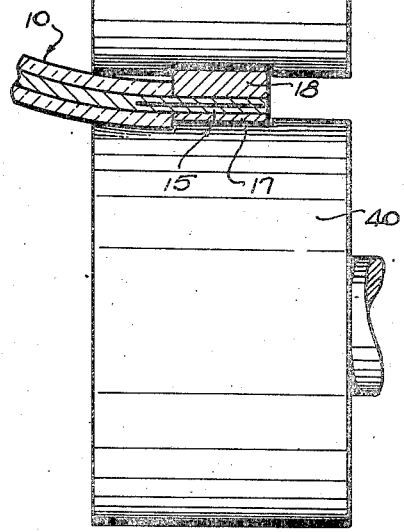
Fig. 9 illustrates the securing of the additional strips of plastic to the plastic border.
Figure 8:
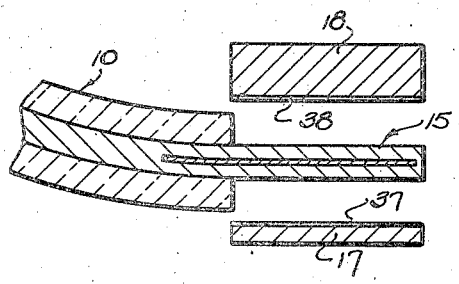
Fig. 8 is a transverse section illustrating the building up of the plastic border with the use of additional strips of plastic.

This is herein accomplished by bonding to opposite sides of the plastic border 15 the additional strips of plastic 17 and 18 after the glass-plastic laminations have been composited. To secure the plastic strips 17 and 18 to the plastic border 15, there is applied to the said strips and/or plastic border coatings 37 and 38 (Fig. 8) of a suitable adhesive such as butyryl Cellosolve, or any suitable solvent which will render the plastic surfaces tacky. The plastic strips are then pressed against the plastic border, after which they are passed between a pair of so-called edge rolls 39 and 40 (Fig. 9) preferably of rubber, rubber composition or other resilient, compressible material. As the edge portions of the laminated sheet pass between the rolls 39 and 40, the pressure exerted thereon by the said rolls will be sufficient to cause the strips 17 and 18 to adhere firmly to the plastic border 15. It is preferred that the plastic strips 17 and 18 be warmed before application to the plastic border as this permits them to be more easily handled and bent around the corners of the glass sheets. Also, it is preferred that the entire laminated sheet be warmed before subjecting the strips 17 and 18 to the action of the edge rolls 39 and 40.

We claim:

1. A process of manufacturing safety glass, which comprises assembling two layers of glass and an interposed layer of plastic material to form a "sandwich" and in which the plastic interlayer projects beyond the glass layers to provide a plastic border, applying protecting strips of paperboard to opposite faces of the plastic border and removably securing them thereto, bonding the glass and plastic laminations only together to form a composite structure, and then removing the paperboard strips from the plastic border.

2. A process of manufacturing safety glass, which comprises assembling two layers of glass and an interposed layer of plastic material to form a "sandwich" and in which the plastic interlayer projects beyond the glass layers to provide a plastic border, applying protecting strips of paperboard to opposite faces of the plastic border and stapling them thereto, subjecting the assembly to heat and pressure to bond the glass and plastic laminations only together to form a composite structure, and then removing the paperboard strips from the plastic border and trimming off the portion of the plastic border marred by the staples.

3. A process of manufacturing bent safety glass, which comprises assembling two layers of glass and an interposed layer of plastic material to form a "sandwich" and in which the plastic interlayer projects beyond the glass layers to provide a plastic border, applying protecting strips of a flexible paperboard to opposite faces of the plastic border and removably securing them thereto, bonding the glass and plastic laminations only together to form a composite structure, and then removing the paperboard strips from the plastic border.

4. A process of manufacturing bent safety glass, which comprises assembling two layers of glass and an interposed layer of plastic material to form a "sandwich" and in which the plastic interlayer projects beyond the glass layers to provide a plastic border, applying protecting strips of a flexible paperboard to opposite faces of the plastic border and stapling them thereto, subjecting the assembly to heat and pressure to bond the glass and plastic laminations only together to form a composite structure, and then removing the paperboard strips from the plastic border and trimming off the portion of the plastic border marred by the staples.

JAMES H. BOICEY.
IRVIN A. WILLEY.